(12) United States Patent  
Leary et al.

(10) Patent No.: US 7,337,361 B2
(45) Date of Patent: Feb. 26, 2008

(54) TEST HARNESS FOR ENTERPRISE APPLICATION INTEGRATION ENVIRONMENT

(75) Inventors: Matthew J. Leary, Brookline, MA (US); Janet L. Austin, Sedalia, CO (US); George A. Hallenbeck, Denver, CO (US); Trevor E. Miller, Highlands Ranch, CO (US)

(73) Assignee: Evolving Systems, Inc., Englewood, CO (US)

( * ) Notice: Subject to any disclaimer, the term of this patent is extended or adjusted under 35 U.S.C. 154(b) by 489 days.

(21) Appl. No.: 10/665,076

(22) Filed: Sep. 16, 2003

(65) Prior Publication Data

US 2005/0060610 A1     Mar. 17, 2005

(51) Int. Cl.
*G06F 11/00* (2006.01)
(52) U.S. Cl. .......................................... 714/25; 714/43
(58) Field of Classification Search ................. 714/25; 709/231
See application file for complete search history.

(56) References Cited

U.S. PATENT DOCUMENTS

| | | | | |
|---|---|---|---|---|
| 5,566,170 | A * | 10/1996 | Bakke et al. | 370/392 |
| 6,959,431 | B1 * | 10/2005 | Shiels et al. | 717/124 |
| 7,032,031 | B2 * | 4/2006 | Jungck et al. | 709/246 |
| 7,114,009 | B2 * | 9/2006 | Jones et al. | 709/250 |
| 2002/0109734 | A1 * | 8/2002 | Umezu et al. | 345/846 |
| 2002/0199182 | A1 * | 12/2002 | Whitehead | 725/1 |
| 2003/0034888 | A1 * | 2/2003 | Ernst et al. | 340/540 |
| 2003/0212778 | A1 * | 11/2003 | Collomb | 709/223 |
| 2003/0229718 | A1 * | 12/2003 | Tock et al. | 709/246 |
| 2004/0039980 | A1 * | 2/2004 | Zak et al. | 714/758 |
| 2004/0064431 | A1 * | 4/2004 | Dorner et al. | 707/1 |
| 2004/0240462 | A1 * | 12/2004 | T V et al. | 370/432 |

OTHER PUBLICATIONS

Gregor Hohpe and Wendy Istvanick. "Test-Driven Development in Enterprise Integration Projects". Nov. 2002.*
Gianpaolo Cugola and H.-Arno Jacobsen. "Using Publish/Subscribe Middleware for Mobile Systems".*
Arsin Corporation (2002) EAI and B2B Testing http://www.arsin.com/docs/DTCT-FS-v2.pdf.
Classiq (2001) Testing Strategy for EAI (Enterprise Application Integration) and B2B (Business to Business Integration): The Component Testing Approach http://www.classiq.com/WhitePapers/EAIB2BTestingStrategy.htm.

(Continued)

*Primary Examiner*—Joshua Lohn
(74) *Attorney, Agent, or Firm*—Swanson & Bratschun, LLC

(57) ABSTRACT

A test harness is provided for fully testing an enterprise application integration ("EAI") environment. The test harness is preferably used with a GUI-based test tool and includes a test controller, a message collector and a test validator. The test controller transmits control signals to the message collector to configure the message collector to "listen" for predefined messages on a message bus. If a message matches the configuration rules, the test validator compares the message to a set of validation rules. If the message matches the validation rules, the test is deemed a success. Test-created messages may also be injected onto the bus by a message generator and unavailable EAI applications may be simulated by a test responder. Preferably, the message collection and generation configurations are based on templates created from previously stored messages. Off-bus applications may be tested by employing a message "tee" coupled to the bus.

17 Claims, 17 Drawing Sheets

OTHER PUBLICATIONS

Evolving Systems (2003) Difficulties in EAI Testing—Sea Change for EAI Testing Created by Confluence of Recent Technologies http://www.evolving.com/ThoughtLeadership/EAITesting.pdf.

Fowler et al. (2002) Agile EAI, Thoughtworks, http://www.eaipatterns.com/docs/Agile%20EAI.pdf.

Hohpe et al. (2002) Test-Driven Development in Enterprise Integration Projects, Thoughtworks, http://www.hohpe.com/Gregor/Work/docs/TestDrivenEAI.pdf.

\* cited by examiner

TEST HARNESS FOR ENTERPRISE APPLICATION INTEGRATION ENVIRONMENT

FIELD OF THE INVENTION

The present invention relates generally to enterprise application integration ("EAI") and, in particular, to providing apparatus and methods for testing of the full EAI environment.

BACKGROUND OF THE INVENTION

Organizations, especially businesses, have been adopting large scale computer systems based on message-oriented enterprise application integration (EAI) in greater and greater numbers. Tremendous value is realized by an organization from re-use of systems, sharing of resources, and standardization of applications. FIG. 1 is a high level block diagram of an exemplary EAI environment 100. The environment 100 is assembled around a central bus, such as an enterprise message bus 102, to which various enterprise systems or applications 104A, 104B and 104C are attached. The systems 104A, 104B and 104C may be incompatible as discrete systems (that is, they may not be able to exchange data as stand alone systems). However, the message bus 102 allows the systems 104A, 104B and 104C to exchange transactions or messages with each other using a common message format, such as the frequently used Extensible Markup Language (XML). Adapters between a system 104 and the bus 102 "translate" messages between the common message format and whatever format is used by a particular system 104. Thus, transactions may be exchanged among disparate systems. In fact, some environments may include over a thousand individual applications, integrated and working together only through the use of an EAI message bus.

Certain systems 104D may not be currently attached to the bus 102 due to undergoing installation or maintenance or being unavailable for any of various other reasons. Other systems or applications 106A and 106B are considered "off-bus" and communicate with each other through direct, point-to-point messages which may have a proprietary format. While not directly attached to the EAI environment 100, the off-bus applications 106A and 106B may be indirectly coupled to the EAI environment 100 through an existing EAI system, such as the system 104C.

FIG. 2A is a system diagram of a portion 200 of an exemplary EAI system in a business environment. The illustrated portion 200 includes an order entry system or application 202, a credit check system 206 and an order management system 210. Each system 202, 206, 210 is attached to an enterprise bus 214 through a bus adapter 204, 208, 212, respectively. FIG. 2B is a corresponding transaction diagram which illustrates the sequence of transaction processing in the system portion 200. Briefly, when a new purchase order is received from a customer, it is entered into the order entry system 202 where a new order is created (step 220). Specific information about the new order (such as customer name, transaction amount and other transaction terms) is transmitted through the bus 214 to the credit check system 206 (step 222). If credit is approved by the credit check system 206 (step 224), an order validation is transmitted back to the order entry system 202 (step 226), enabling the order to be further processed (step 228). In the foregoing brief synopsis, the order management system 210 does not participate. However, the order management system 210 may subsequently receive information messages from the order entry system 202 to enable the order to be filled. The order management system 210 may exchange messages with an inventory management system (not shown) and, eventually, an accounts management system (also not shown). It will be apparent that in a large company, thousands of messages may be exchanged over the bus each day. It will also be apparent that proper operation of the entire enterprise may be critical to a company's continued existence. Thus, suitable testing of enterprise applications is also critical.

It is well known for computer systems and applications to be tested at least upon installation and upgrade. Periodic testing may also be performed. In an EAI environment, it is typical to test individual applications to ensure their correct operation. FIG. 3 is a high level block diagram of the exemplary EAI environment 100 of FIG. 1 with an application 104A being tested through a test tool 300 (although not shown in FIG. 3, the other applications would be similarly tested). One type of tool which may be used to test an application is a GUI (graphical user interface) based tool. A GUI test tool accesses the target application through the target application's user interface and can, therefore, direct activity or collect test results only to the same extent as the target application itself has access to the rest of the enterprise environment. Thus, numerous aspects of a transaction are out of reach. Moreover, if using a GUI-based test tool, dozens, or even hundreds, of lines of code, may be necessary to navigate an order entry screen and fill in each text box, radio button and tab of the order form before the 'save" button is pressed to execute the test. Then, additional coding may be necessary to compute and enter a simulated response into another screen. And, with numerous transactions out of reach of a GUI-based tool associated with one particular application, similar tools must be used to test the other applications in the environment; however, only individual applications are able to be tested, not any interactions among applications.

Another type of tool which may be used is an application programming interface ("API") based test tool. However, typical API-based tools have similar drawbacks to those of GUI-based test tools. One particular drawback is the need for extensive programming in order to build simulations.

Thus, conventional test tools only test an individual component of an enterprise from the "outside"; that is, from the perspective of the end user or the application interface. For testing of full business processes in an EAI enabled environment, all component systems and applications should be available and functioning correctly (alternatively, unavailable systems should be replaced by appropriate simulators or advanced EAI testing capabilities). But, as the number of individual applications in an enterprise environment increases, the number of combinations of possible side effects to each possible group of interacting applications rises factorially. Unfortunately, the complexity and scale of large EAI environments makes manual testing prohibitive. And, neither automated testing from the perspective of the enterprise itself, with full end-to-end business process testing, nor automated integration testing has been available.

Thus, a need remains for automated, end-to-end testing of business processes across an EAI environment. Moreover, creating and executing tests should be relatively easy and include repeatable regression testing, results validation should be flexible and pass/fail results should be easily identified.

SUMMARY OF THE INVENTION

The present invention provides a system, control interface, method, computer program product and data processing communications device for automated, end-to-end testing of business processes across an an enterprise application integration ("EAI") environment. The testing is relatively easy and results validation is flexible with pass/fail results easily identified.

The system, control interface, method, computer program product and data processing communications device are preferably used with a GUI-based test tool and includes a test controller, a message collector and a test validator. The test controller transmits control signals to the message collector to configure the message collector to "listen" for predefined messages on a message bus. If a message matches the configuration rules, the test validator compares the message to a set of validation rules. If the message matches the validation rules, the test is deemed a success. Test-created messages may also be injected onto the bus by a message generator and unavailable EAI applications may be simulated by a test responder. Preferably, the message collection and generation configurations are based on templates created from previously stored messages. Off-bus applications may be tested by employing a message "tee" coupled to the bus.

DETAILED DESCRIPTION OF THE INVENTION

Overview of Test Harness

Figure 1:
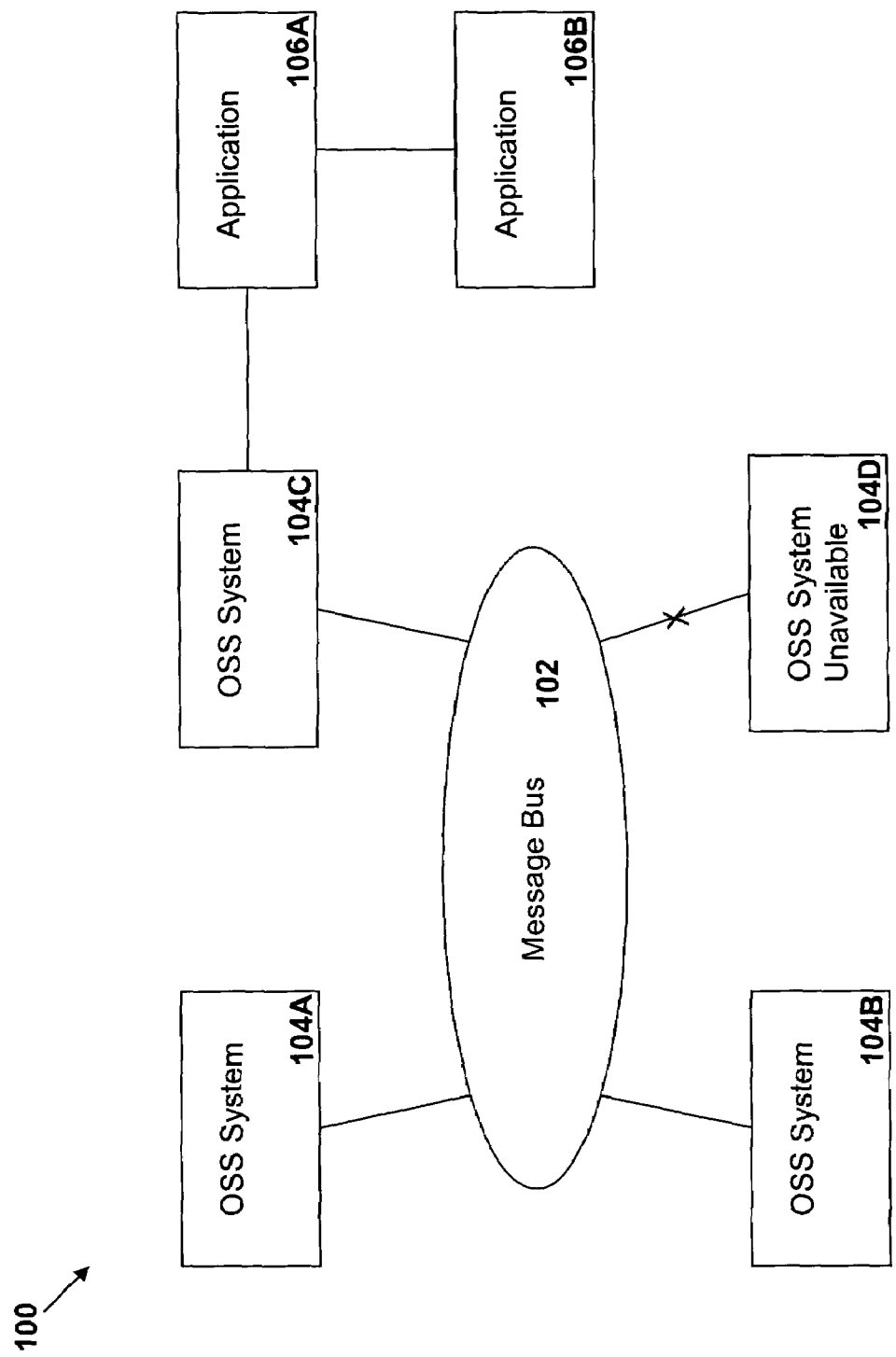
FIG. 1 is a high level block diagram of an enterprise application integration environment.
Figure 2A:
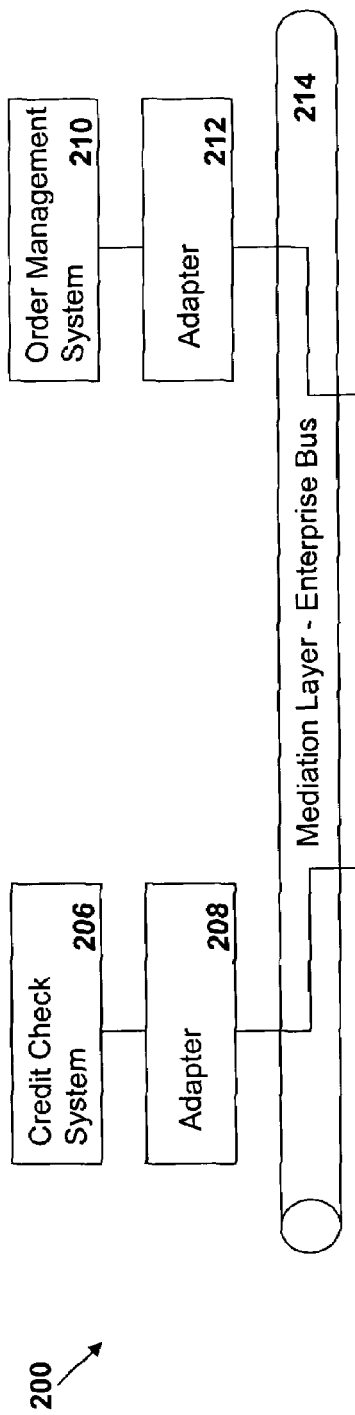
FIG. 2A is a system diagram of a portion of an exemplary EAI system in a business environment.
Figure 2B:
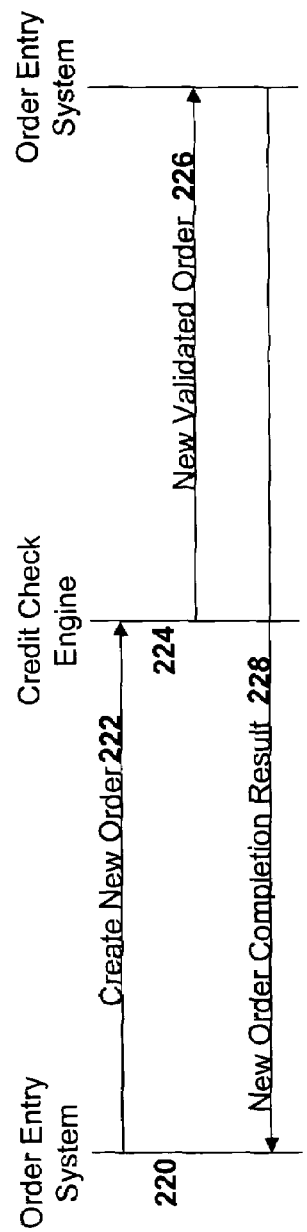
FIG. 2B is an system transaction diagram illustrating the sequence of transaction processing of the system portion of FIG. 2A.
Figure 3:
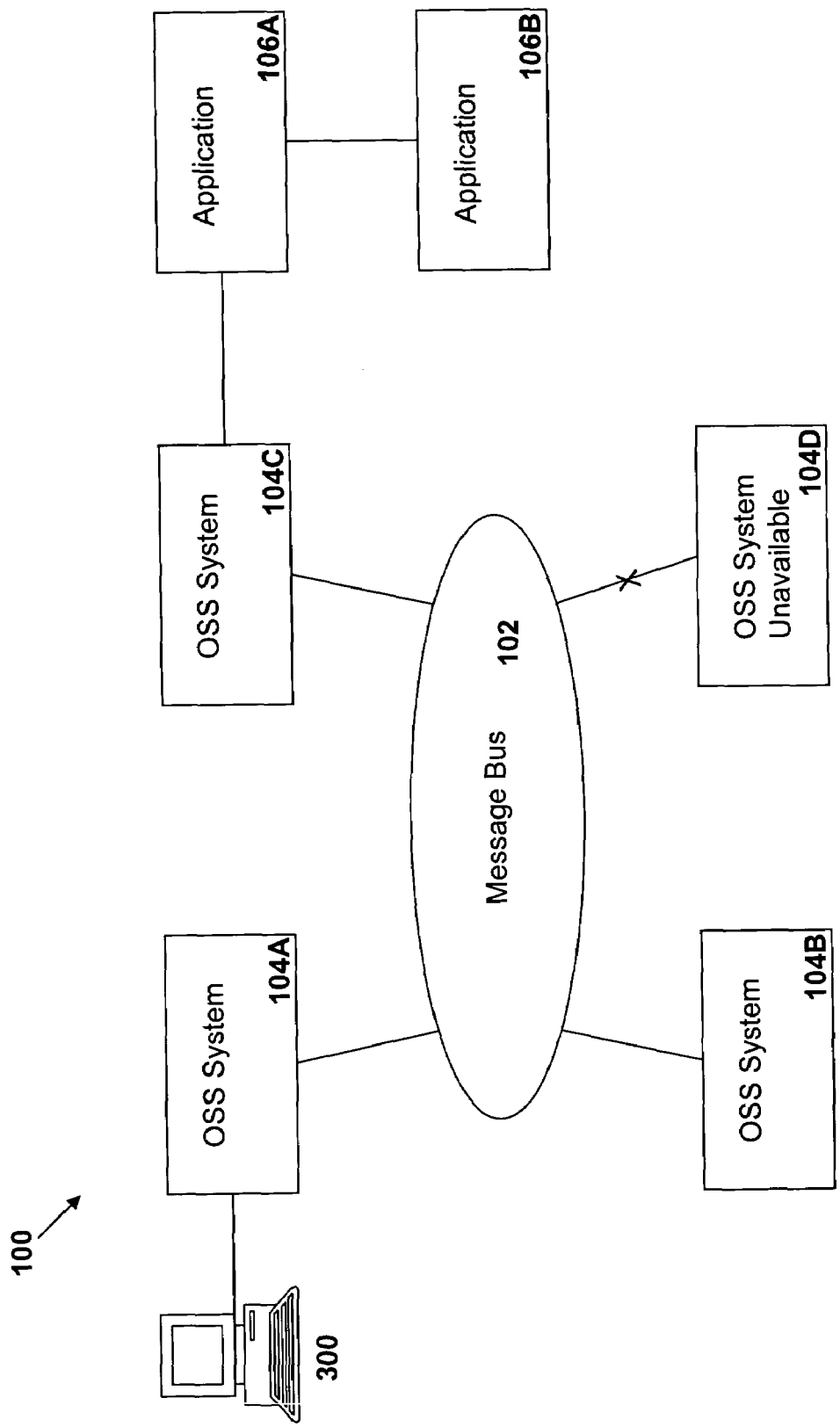
FIG. 3 is a high level block diagram of the exemplary EAI environment of FIG. 1 in which one of the applications is undergoing testing.
Figure 4:
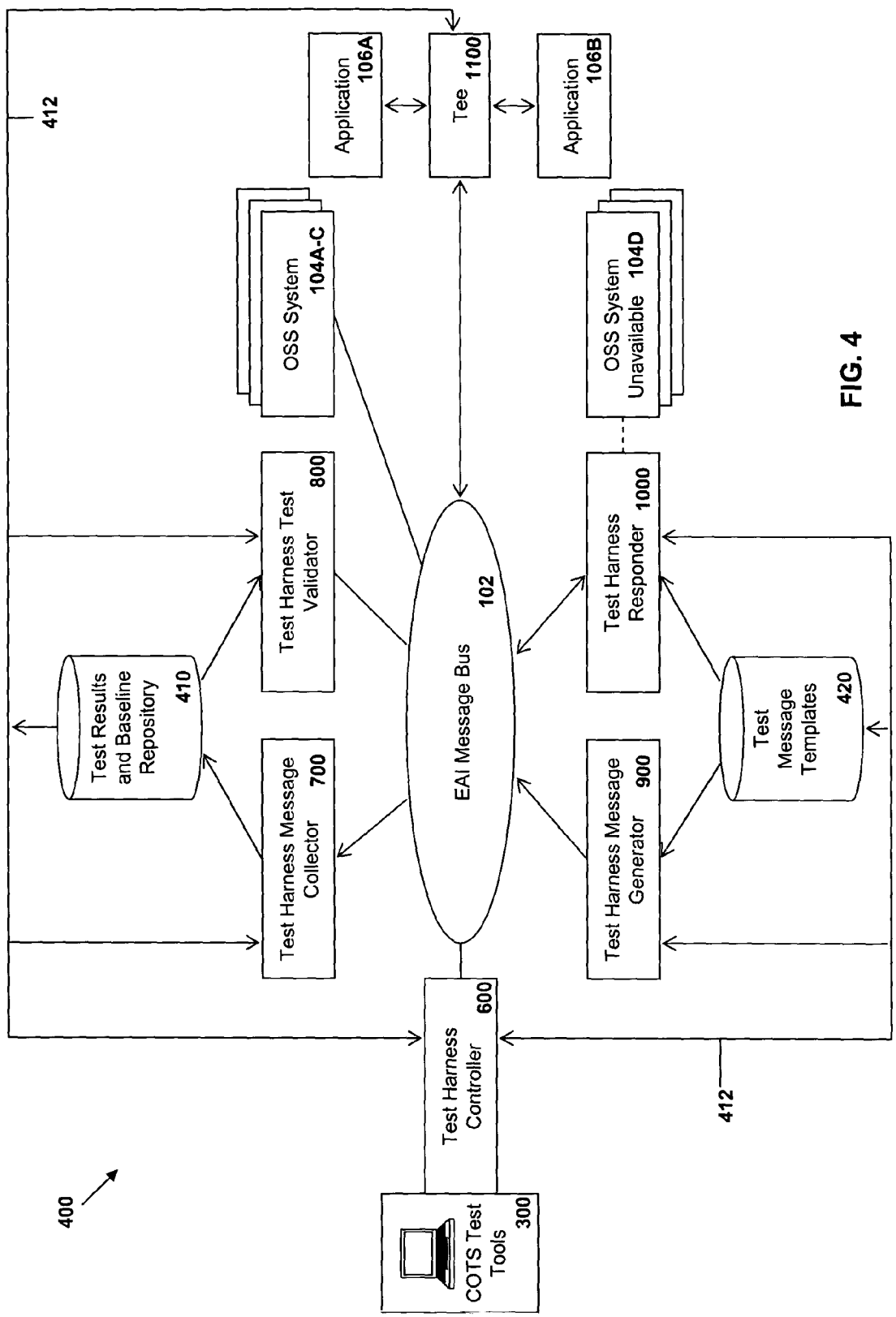
FIG. 4 is a high level block diagram of an enterprise application integration environment employing components of the present invention.

FIG. 4 is a high level block diagram of the enterprise application integration environment 100 in which components of the present invention are employed. The EAI environment 100 itself is comparable to that illustrated in FIG. 1 with a central bus, such as an enterprise message bus 102, to which various enterprise systems or applications 104A-C are attached. Other systems 104D may not be currently attached to the bus 102 due to any of various reasons and still other systems or applications 106A and 106B may be "off-bus". The off-bus applications 106A and 106B may be indirectly coupled to the EAI environment 100 through an existing EAI system or application.

The present invention, referred to as a "test harness" 400, includes a test harness controller 600, a message collector 700 and a message validator 800. The test harness 400 may also optionally include a message generator 900, a responder 1000 and/or a message "tee" 1100. The message collector 700, the test validator 800, the message generator 900, the responder 1000 and the tee 1100 are interconnected with the test controller 600 in order to communicate test related data among the components. Such interconnection may be through the message bus 102 or, preferably, through a separate internal control bus 412. The message collector 700, the test validator 800, the message generator 900, the responder 1000 and the tee 1100 are also interconnected with the message bus 102 in order to transmit and receive application messages. A test results and baseline database or repository 410 is accessible to the message collector 700 and the test validator 800. A test message template database or repository 420 is accessible to the message generator 900 and the responder 1000. Preferably, the test controller 600 interfaces with a test tool, such as a commercial off the shelf ("COTS") tool 300.

The scope of the present invention does not depend upon any particular physical configuration. The test harness components 600, 700, 800, 900, 1000, 1100, 410 and 420 may be physically located at a single site within the enterprise environment 400 or may be distributed over any number of geographically separated sites. The components 600, 700, 800, 900, 1000, 1100, 410 and 420 may comprise, or may be executed from, any computer having access to the message bus 102, including dedicated computers or workstations, or may share computing resources with each other or with other applications. Moreover, any of the components 600, 700, 800, 900, 1000 and 1100 may comprise computer-executable instructions permanently or temporarily stored on any computer-readable medium. Multiple instances of any of the components 700, 800, 900, 1000 and 1100 may be created for a particular test and multiple instances of any of the components 600, 700, 800, 900, 1000, 1100, 410 and 420 may be created for multiple simultaneous tests.

Figure 5A:
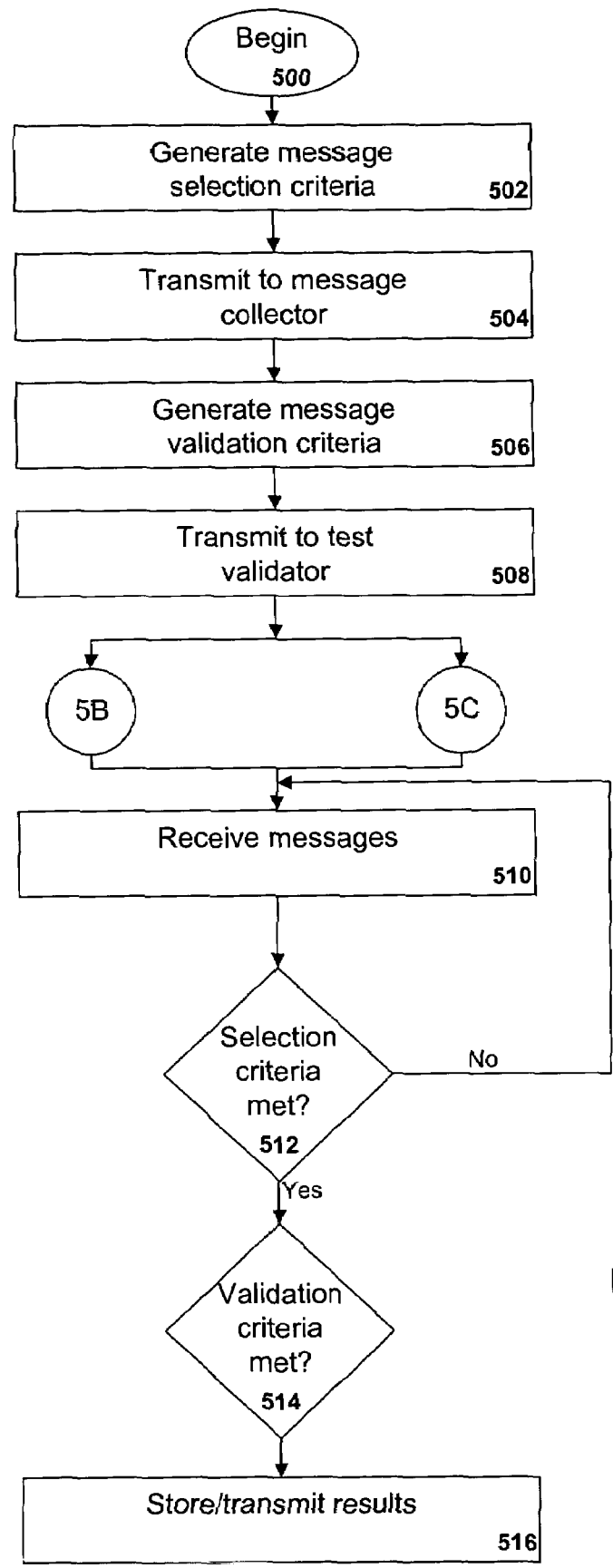
FIG. 5A is a flowchart of a method of the present invention.

The flowchart of FIG. 5A provides an overview of a method of the test harness 400. A test engineer or other test harness user begins the procedure (step 500) by programming the test controller 600 through the COTS test tool 300. The test engineer generates message selection criteria (step 502) which is transmitted to the message collector 700 (step 504) over the control bus 412, thus configuring the message collector 700 for the test. The test engineer also generates message validation criteria (step 506) which is transmitted to the test validator 800 (step 508) over the control bus 412, thus configuring the test validator 800. Both message selection criteria and message validation criteria may be created directly by the test engineer through the COTS test tool 300 and the test controller 600. Alternatively, the criteria may be generated based upon selected message templates stored in the template database 420. When the test is run, the message collector 700, attached as it is to the message bus 102, transparently receives messages being transmitted over the message bus 102 among the applications 104 (step 510). Each message is compared to the message criteria (step 512). If the criteria is not met, no action is taken; however, if the criteria is met, the message is then compared with the validation criteria (step 514). The results of the validation comparison may then be stored in the test results repository 570 for later analysis or may be transmitted to the user (step 516) for immediate analysis.

Figure 5B:
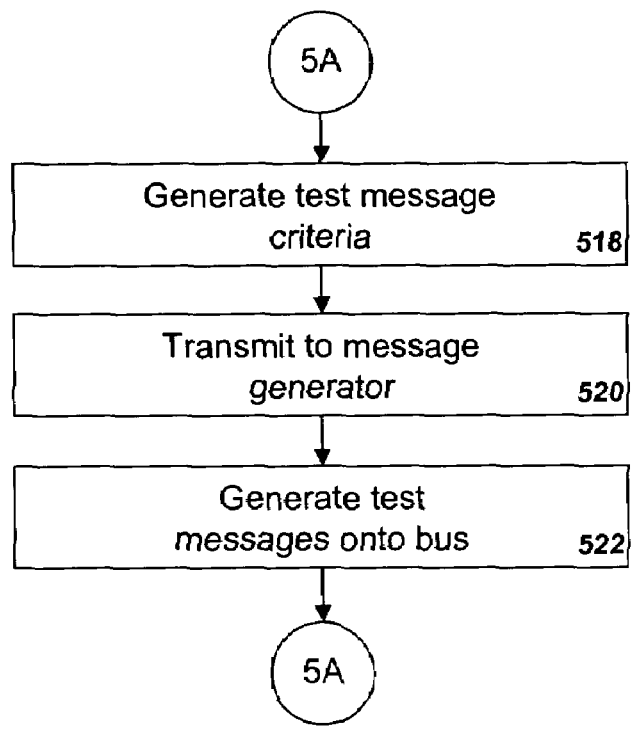
FIG. 5B is a flowchart of one aspect of the method of FIG. 5A.

Referring to FIG. 5B, the test engineer may wish to include specific, predefined messages in the testing process. Such messages may be generated directly by the test engineer through the COTS test tool 300 and the test controller 600. Alternatively, the predefined messages may be generated based upon selected message templates stored in the template database 420. Upon being configured through the test controller 600 (steps 518, 520), the message generator 900 injects the predefined message onto the message bus 102 directed towards a target application (step 522). The message collector 700 listens for and receives any resulting message from the target application (or any other active application) and processes the resulting message according to the flowchart of FIG. 5A.

Figure 5C:
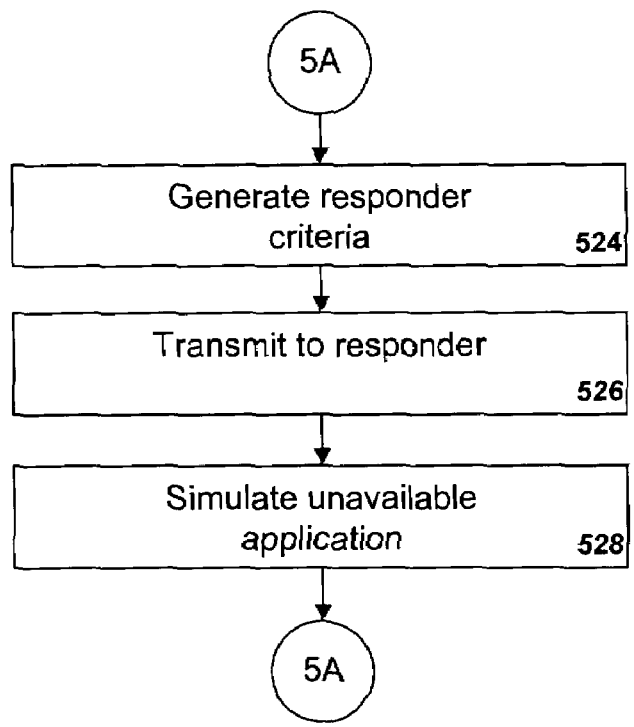
FIG. 5C is a flowchart of another aspect of the method of FIG. 5A.

A particular application 104D may be unavailable during a test. Such an application 104D may not yet be fully installed, may be out of service for maintenance or may be intentionally be taken off-line to prevent undesirable effects during the test. Referring to FIG. 5C, the test engineer may configure the responder 1000 to simulate the particular application 104D (steps 524, 526). The test is then run as if the particular application 104D is actually attached to the message bus 102 with messages which typically would be generated by the particular application 104D being generated instead by the responder 1000 based on message templates stored in the template database 420 (or programmed directly by the test engineer) (step 528). The message collector 700 listens for and receives any resulting message from the responder and processes the resulting message according to the flowchart of FIG. 5A.

Test Controller

Figure 6:
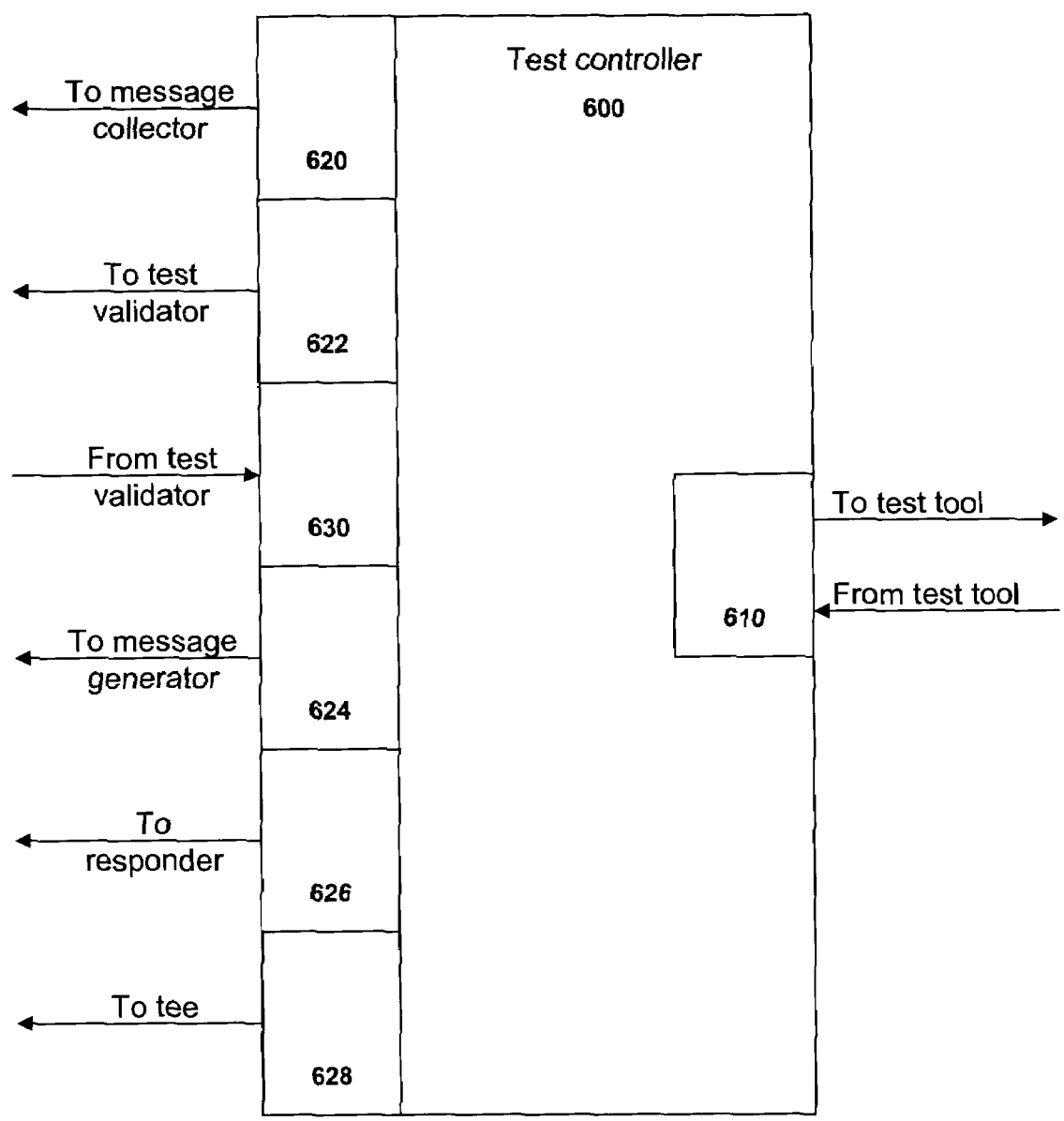
FIG. 6 is a block diagram of the test controller of the present invention.

FIG. 6 is a block diagram of the test controller 600. Preferably, the test controller 600 interfaces with a test tool, such as a commercial off the shelf ("COTS") tool 300, through an interface 610. Using COTS tool 300, the test controller 600 may be programmed to operate the test harness 400. WinRunner®, marketed by Mercury Interactive Corp., is among the COTS test tools 300 which may be used by the test harness 400 for its user interface to create and manage test scripts, test results and test logs. By itself, WinRunner (and other similar products) is GUI-based and thus does not provide testing support for EAI message bus environments. Another tool, such as TestDirector® (also marketed by Mercury Interactive Corp.), may be used to drive and schedule test sessions (by driving WinRunner) and aggregate and store test results.

The test controller 600 includes a set of interfaces 620, 622, 624, 626 and 628 through which configuration instructions may be transmitted to the message collector 700, the test validator 800, the message generator 900, the responder 1000 and the tee 1100, respectively. The test controller 600 also includes an interface 630 through which test results may be received from the test validator 800. It will be appreciated that the interfaces 620, 622, 624, 626, 628 and 630 may comprise a single physical interface coupled to the control bus 412 or may be separate. It will also be appreciated that communications between the test controller 600 and other test harness components 700, 800, 900, 1000 and 1100 may be processed through the message bus interface 610.

Interposed between the COTS tool 300 and the message bus 102, the test controller 600 provides "extensions" to the COTS tool 300 which permit the test engineer to leverage the functionality of the COTS tool 300 to communicate with test harness components through the message bus 102. More specifically, the extensions are part of a software library which provides an API (application programming interface) to configure and control other components of the test harness 400. Extensions provided by the test controller 600 may include (among others): start test session; configure message generator; configure message responder; configure message collector; configure test validator; start message responder; start message collector; send message; stop message collector; stop message responder; run validation; get validation results; delete test session; and delete message collection. These functions may be called from test scripts developed by the test engineer and executed by the test controller 600 through the COTS tool 300 and allow test-driven message topics, message formats, message triggers, response mapping, collection rules and validation rules.

Message Collector

Figure 7:
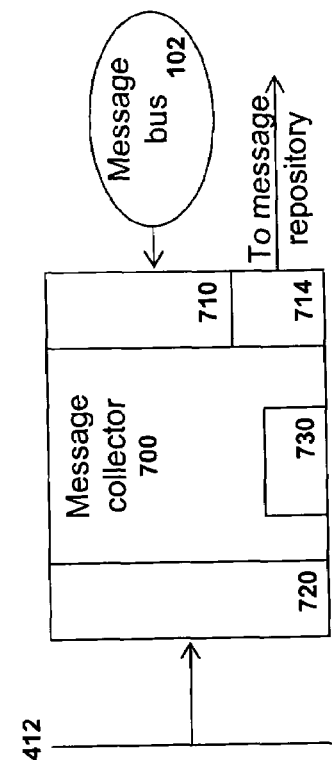
FIG. 7 is a block diagram of the message collector of the present invention.

FIG. 7 is a block diagram of the message collector 700 which is attached to the message bus 102 by a receiver 710 to enable the message collector 700 to passively and transparently observe messages being exchanged on the message bus 102 by applications 104. An interface 720 couples the message collector 700 to the control bus 412 to enable the message collector 700 to receive message selection criteria and other configuration instructions from the test controller 600. Another interface 714 couples the message collector 700 with the message repository 410 to enable identified messages to be collected and stored in the repository 410. It will be appreciated that the interface 720 may comprise a two-way interface to enable the message collector to transmit data, such as status information, back to the test controller 600. However, for clarity these interfaces (and like interfaces in the test validator 800, the message generator 900, the responder 1000 and the tee 1100) are illustrated in the Fig. as being one-way interfaces.

The message collector 700 further includes a comparison element 730 to compare received messages with the message selection criteria and identify "trigger" messages which match the criteria. A message consists of several data elements, including a message subject and a message payload, the latter defined by one or more "tags" and corresponding "values". For example, a subject may be 'create new order', a tag may be 'customer name' and the corresponding value may be 'Smith'. The selection criteria may be simple, such as matching an entire message, or may be complex and include relational comparisons and/or Boolean logic to be matched against one or more data elements in each message. The criteria may comprise a subject value and/or a payload value. Including a payload value permits collection of messages based on the contents of the message payload. For example, the criteria may direct the collection of messages in which the 'customer name'='Smith' AND the 'order date'>'Jun. 30, 2003'. Configuring the message collector 700 using templates permits a test engineer to focus on test-specific areas of interest in data and messages and not be concerned with unimportant (relative to the test) but necessary data elements. Use of templates based on actual, previously gathered messages also reduces the time required to create test data and increases test accuracy.

If a message meets the defined criteria, it may be stored in the test results repository 410 for subsequent evaluation by the test validator 800. Alternatively, the identified message may be transmitted directly to the test validator 800. Also alternatively, identified messages may be directly analyzed by the test engineer without being processed by the test validator 800. Preferably, a unique identifier is added to each message to be analyzed; the unique identifier may include a session or test identifier (unique to the particular test being run) and a collection identifier (unique to a collection of matching messages identified during a particular portion of the test).

A message collector 700 may also be employed to collect messages while the applications 104 and message bus 102 are in normal (non-test) operation. Such messages may be used to automatically generate new test templates.

Test Validator

Figure 8:
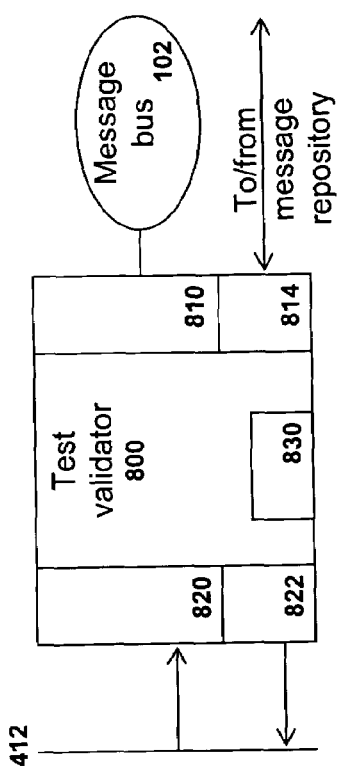
FIG. 8 is a block diagram of the test validator of the present invention.

FIG. 8 is a block diagram of the test validator 800 which is attached to the message bus 102 by a receiver 810. An interface 820 couples the test validator 800 to the control bus 412 to enable the test validator 800 to receive test validation criteria and other configuration instructions from the test controller 600. Another interface 822 couples the test validator 800 to the control bus 412 to enable the test validator 800 to transmit test validation results to the test controller 600. The validator 800 further includes a comparison element 830 to compare collected messages with the validation criteria and identify those messages which match the criteria. Another interface 814 couples the test validator 800 with the message repository 410 to enable the test validator 800 to access collected messages and store test results in the repository 410 for subsequent access by the test controller 600.

Validation criteria are preferably designed to provide for an intelligent comparison of the collected messages to a predefined baseline, such as a regression baseline, set of messages. Alternatively, specified elements of collected messages may be compared instead to particular values. Intelligent comparisons enable reasonable differences between a baseline message and a collected message to be selectively ignored. Such differences may include, for example, the transaction ID number, the test date or the order number. Moreover, the validation criteria may equate one or more parameters in the baseline message with the corresponding parameter in the collected test message. For example, the customer ID in the baseline message may be deemed to be equal to the customer ID in the collected message. Thus, validation does not depend upon trivial or expected differences between a baseline message and a collected message. Additional validation criteria may include "compare all except specified tags" (ignore specified tags), "compare only specified tags" (ignore all other tags), or "compare tag/value to a provided value". As in the case of message selection criteria, validation comparisons may be simple or complex and may include Boolean operators.

Message Generator

As previously noted, there may be instances in which it is desirable to begin an automated test session by artificially injecting messages onto the message bus 102. While other mechanisms may also be used to begin an automated session, the message generator 900 may be conveniently configured to do so. Moreover, the message generator 900 may also be used to send messages to the message bus 102 in place of messages normally generated by an unavailable system (although the responder 1000 is also available for such purpose and may be configured to receive as well as transmit messages).

Figure 9:
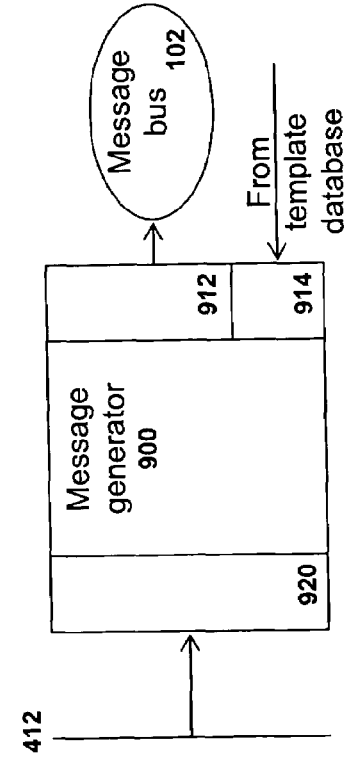
FIG. 9 is a block diagram of the message generator of the present invention.

FIG. 9 is a block diagram of the message generator 900 which is attached to the message bus 102 by a transmitter 912. An interface 920 couples the message generator 900 to the control bus 412 to enable the message generator 900 to receive configuration instructions from the test controller 600. Another interface 914 also couples the message generator 900 with the template database 420 to enable the message generator 900 to obtain message templates from the database 420 for subsequent transmission onto the message bus 102.

The message templates to be used in a test are created and saved by the test engineer prior to running the test. Such templates may be created from scratch or, preferably, and as previously noted, created from messages collected during previous tests or normal operations. For example, an order message generated in a previous test may be used as the basis for a template. If desired, payload values contained in the template may be overridden by configuring the message prior to the current test, thereby permitting the test engineer to customize the data in the message template for the specific test being run.

Responder

Figure 10:
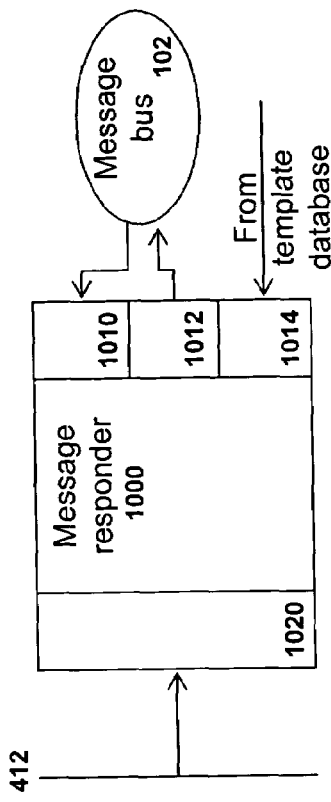
FIG. 10 is a block diagram of the message responder of the present invention.

In the event that an application or system 104D is unavailable to be part of the EAI testing, the present invention provides a responder 1000 to simulate the unavailable application. FIG. 10 is a block.diagram of the responder 1000 which is attached to the message bus 102 by a receiver 1010 and a transmitter 1012. An interface 1020 couples the responder 1000 to the control bus 412 to enable the responder 1000 to receive configuration instructions from the test controller 600. Another interface 1014 also couples the responder 1000 with the template database 420 to enable the responder 1000 to obtain message templates from the database 420 for subsequent transmission onto the message bus 102.

The responder 1000 receives configuration rules from the test controller 600 regarding characteristics of messages (such as message subject and/or patterns or values that are contained in the message). The responder 1000 then passively observes messages being exchanged on the message bus 102, searching for "trigger" messages which match any of the predetermined search patterns. When such a message is received, the responder 1000 uses additional configuration rules, which it also received from the test controller 600, to respond to the trigger message with one or more additional messages sends back to the message bus 102. The response message may be generated from message templates in the template database 420, optionally in combination with rules-based direction to first modify elements of the message template. Modifications to the templates may be based directly on information sent from the test controller 600 or indirectly using information in the trigger message which may then be modified using additional rules to add to or change elements of the original template. Using this technique, the resulting output message may be a combination of a template, information sent from the test controller 600 and/or a mapping of information from the input trigger message. Thus, the responder 1000 will appear to applications and systems on the message bus 102 as if it is the unavailable application 104D.

When configuring the responder 1000, incoming trigger messages may be specified by a combination of message subject and/or payload content. Additionally, the message subject of the response message to be sent by the responder 1000 may be specified along with the name of the template to be used. A set of rules defining the trigger message may describe any pattern of data in the received messages. Thus, the responder simulation may have a different output message for the same input message type, depending upon different values in a particular data field (tag). For example, an input message in which the telephone number ("TN") field contains a '303' area code may trigger one particular response message while an input message containing a '720' area code may trigger a different response message. Among other benefits, such customization permits different test engineers to use the same basic test and the same templates but have the test work in slightly different ways.

As with the message collector 700 and message generator 900, the definition of trigger messages and output message templates to be used in a test are created and saved by the test engineer prior to running the test and may be created with the same simple or complex rules used to configure with the message collector 700 and message generator 900. Such a rule may have the following form:

a) First, refer to <this> output XML file as a template used to respond to the trigger input message and THEN:
 b) Map the input-message's XML sub-section or sub-element/attribute "X" to the output message template's XML sub-section or sub-element/attribute "Y".

Preferably, the responder 1000 may also be configured to send multiple messages in response to the same incoming trigger message as well as to send a response message only after a predefined delay, thereby making the simulation more realistic. Once configured, the responder 1000 may remain in operation independently and indefinitely until, for example, a predefined period of time expires, until a particular message has been received or until a new configuration signal terminates its operation.

Tee

It may be desired to include in a test some applications which are outside of the EAI message bus 102. Such off-bus applications may communicate in a point-to-point fashion, may use multiple data formats (including proprietary data formats) and/or may use non-message-based communications. Additionally, off-bus applications may themselves be part of multiple "sub-busses". In order to bring the off-bus applications into the testing environment, the present invention provides a message "tee" 1100 (FIGS. 11A-C) which is interposed between off-bus, point-to-point applications 106A and 106B through interfaces 1106 and 1108, respectively. The tee 1100 further includes an interface/translator 1110 to the message bus 102. The interface 1110 is operable to exchange protocol and data format agents using software modules which are adaptable to conform to various proprietary communications formats. Thus, the tee 1100 provides observation and control points into point-to-point architectures. More specifically, the tee 1100 provides access to point-to-point messaging between off-bus applications 106A and 106B and allows the off-bus applications 106A and 106B to "believe" that they are communicating with each other even though the actual communications may be intercepted, diverted and/or modified through the tee 1100.

Figure 11A:
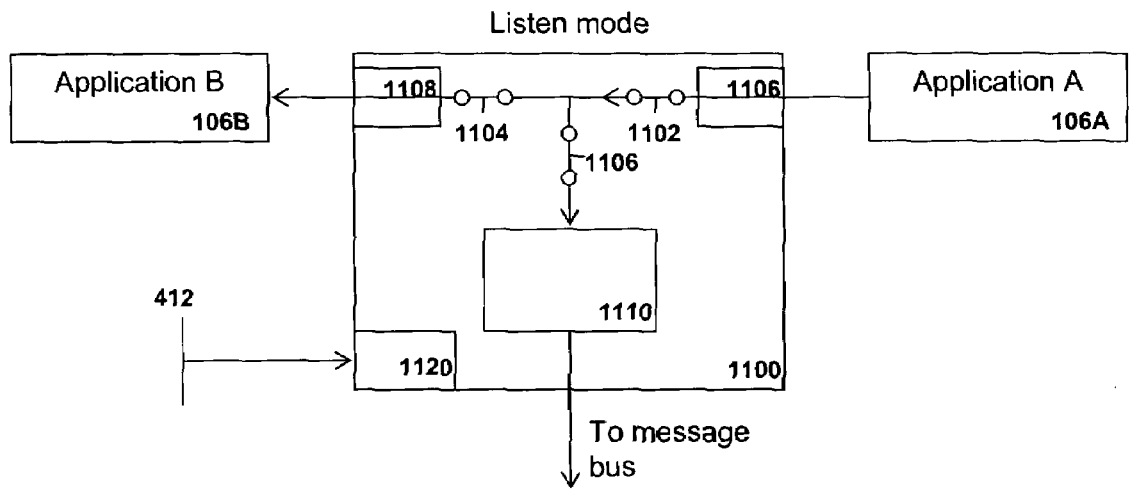
FIG. 11A is a block diagram of the message tee of the present invention in a listen mode.

FIG. 11A illustrates the tee 1100 in a "listen" mode. Switches 1102, 1104 and 1106 are in their closed states. Any communications between the two applications 106A and 106B (as indicated by the arrowheads in FIG. 1A, the off-bus application A 106A is the data-source application and the off-bus application B 106B is the data-target application) passes through the switches 1102 and 1104 enabling the target application 106B to receive the communication with substantially no latency. Such communications are also routed through the third switch 1106 and into the interface/translator 1110 where the communication is translated from its original format into XML (or whatever other message format is used on the message bus 102) and sent onto the message bus 102. In the listen mode, no action is taken with respect to the monitored messages.

Figure 11B:
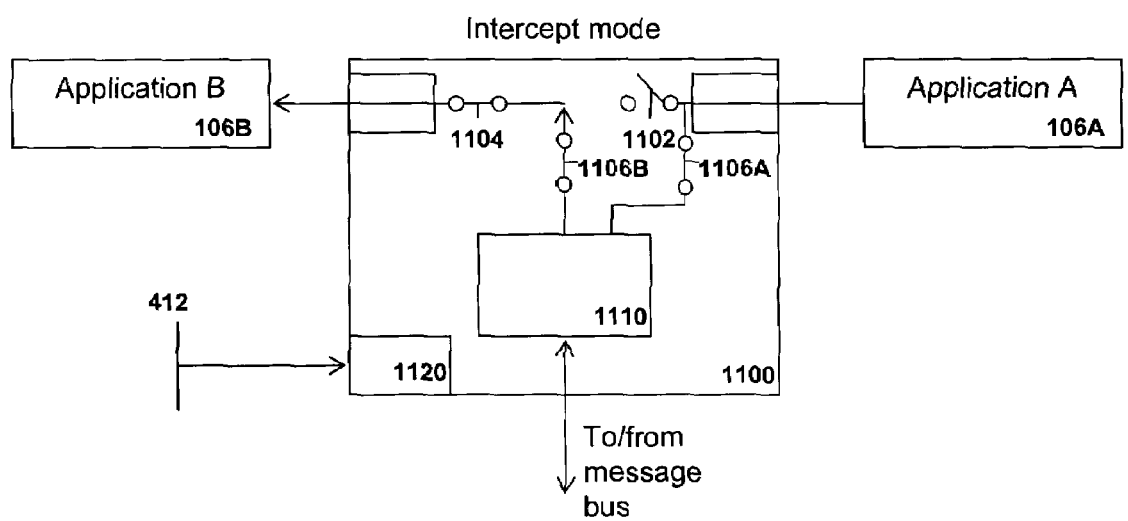
FIG. 11B is a block diagram of the message tee of the present invention in an intercept mode.

FIG. 11B illustrates the tee 1100 in an "intercept" mode. A communication from an off-bus application 106A is intercepted before being received by the target application 106B and is instead routed to the interface/translator 1110 through a switch 1106A. The communication is translated into an XML message and sent onto the message bus 102. The resulting message is then treated as any other message on the bus 102 in that it may be compared by the message collector 700 against selection criteria as part of the EAI test. It may also be received by the responder 1000. Messages may be modified, removed and/or resent. Any message sent back, by the responder to the target off-bus application 106B, for example, is translated from the XML format by the interface/translator 1110 and passed through a switch 1106B to the target application 106B.

Figure 11C:
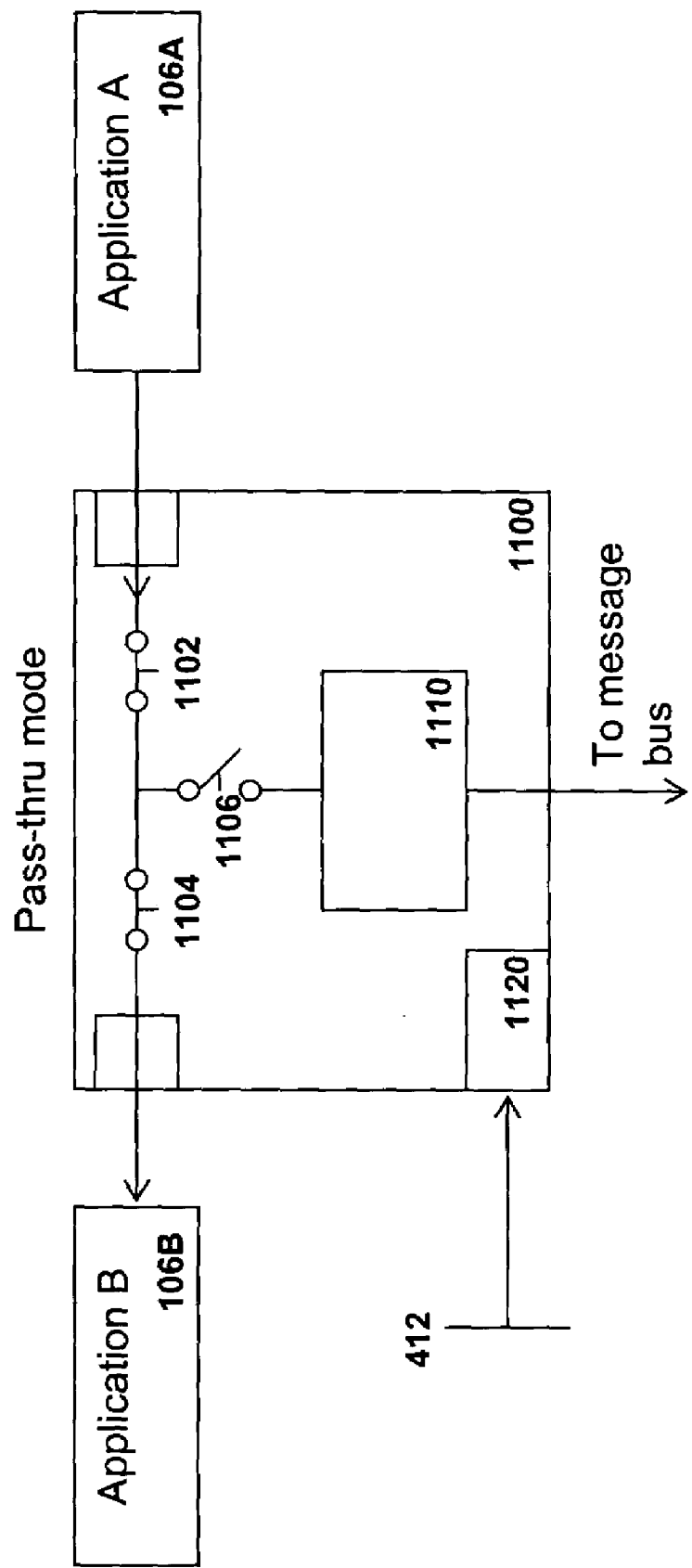
FIG. 11C is a block diagram of the message tee of the present invention in a pass-through mode.

FIG. 11C illustrates the tee 1100 in a "pass-through" mode. The switches 1102 and 1104 are closed, to permit substantially unimpeded communications between the two off-bus applications 106A and 106B, and the switch 1106 is open, preventing the communications from being translated into XML by the interface/translator 1110 and being sent onto the message bus 102.

It will be appreciated that the switches 1102, 1104, 1106, 1106A and 1106B illustrated in FIGS. 11A-11C are merely representative of switching devices or their functional hardware or software equivalents. Switching devices may be single-directional or bi-directional; additional switching devices may be employed, such as in the intercept mode positioned to intercept communications from the second off-bus application 106B to the first 106A. The tee 1100 is configured (that is, the states of the switches are programmed) by the test controller 600 transmitting control signals through the control bus 412 to an interface 1120 in the tee 1100. Although during most activities the tee 1100 introduces very little latency, the tee 1100 may provide a queuing capability to manage high loads in the event that bursts of messages occur, thereby minimizing latency.

The tee 1100 may also provide new capabilities and extensions to formerly "closed" systems. For example, the first off-bus application 106A may occasionally select wrong data to transmit to the other off-bus application 106B and may not be easy to fix the problem through the first off-bus application 106A. Using a tee 1100 in the intercept mode (FIG. 11B), an agent on the message bus 102 (such as a responder) may be configured to look for messages from the first off-bus application 106A with the defective data. The agent then corrects the data and sends the corrected message to the target off-bus application 106B through the tee 1100.

EXAMPLE

Introduction

A simplified, though realistic, use-case is now presented to further describe the architecture and operation of the test harness of the present invention. It is assumed that a test engineer has been tasked to test a small portion of a large business process EAI system. In this example, the ability of an order-management system to create an order initiated from an order entry system and to provide a proper response are critical functions to be regression tested nightly as the rest of an integration development is occurring. The test harness is used to enable WinRunner (or another test tool) to interact with the EAI system in an efficient and meaningful manner.

Figure 12A:
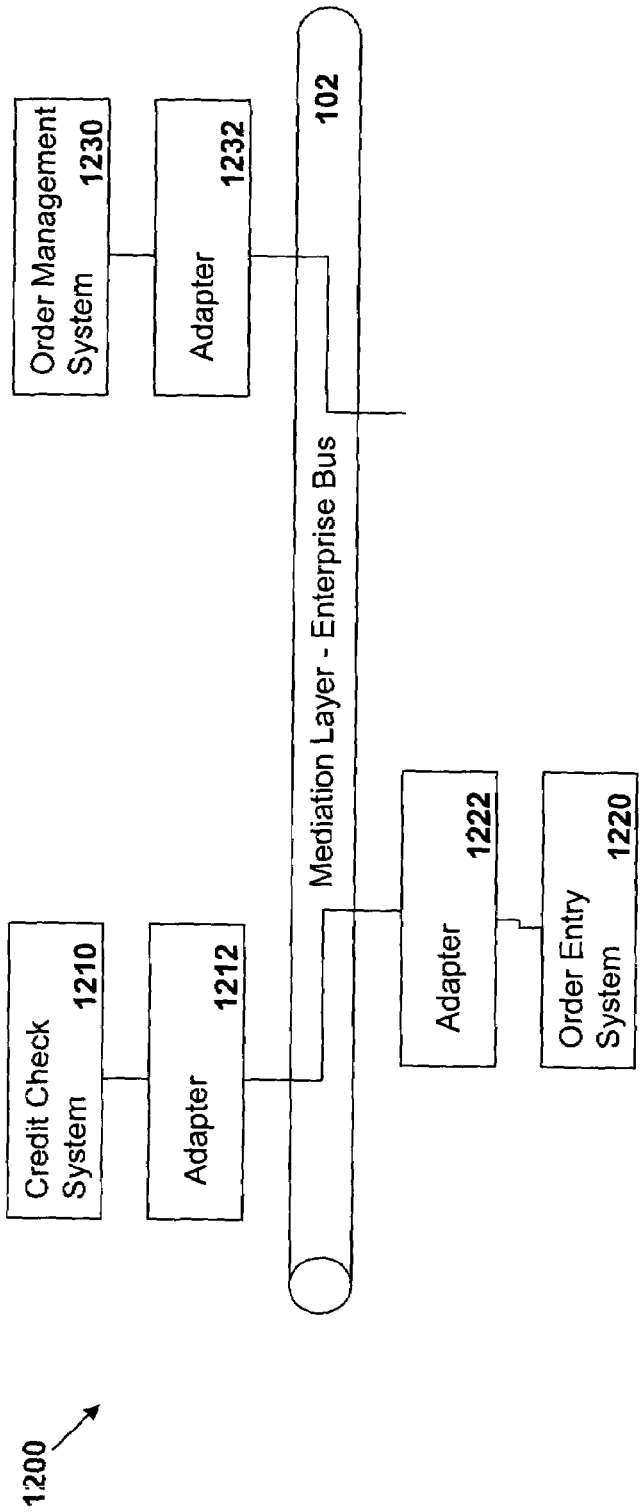
FIG. 12A illustrates a portion of an EAI system to be subjected to an exemplary test.
Figure 12B:
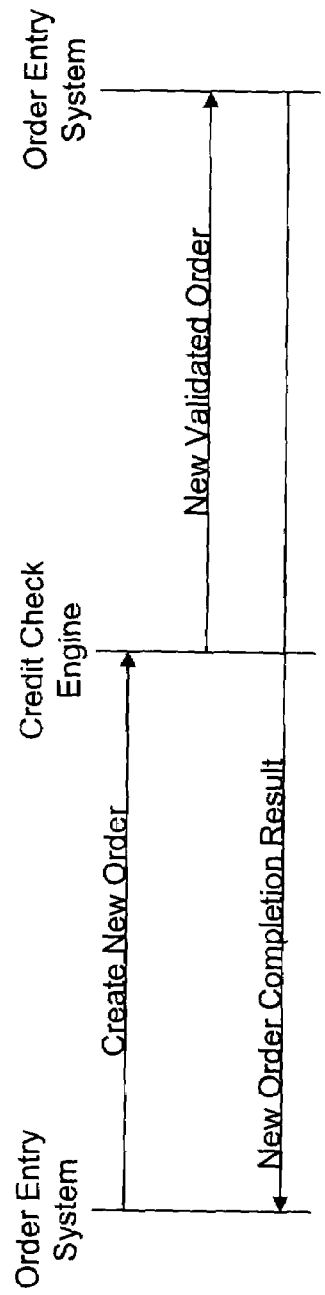
FIG. 12B is a system transaction diagram for the exemplary test.

The portion 1200 of the system relevant to the exemplary test and a system interaction diagram are illustrated in FIGS. 12A and 12B, respectively. A core element in the exemplary interaction is a credit check engine 1210 which takes an original order and validates it for the order entry system 1220. For purposes of this example, the order entry system 1220 has a known interface 1222 to the enterprise bus 102 but does not have a GUI which can be controlled by WinRunner or otherwise driven in a mechanized fashion. An order management system 1230 is also coupled to the bus 102. As described above, the three relevant systems 1210, 1220 and 1230 are coupled to the bus 102 through adapters 1212, 1222, 1232, respectively which translate each particular data format into a common message format (such as, XML). However, for purposes of the exemplary test, it is assumed that the credit check system 1220 is unavailable (as it might be if still under development).

The basic steps taken to create and run the test are:
a) Create message templates (in XML, for example);
b) Create a test script (in WinRunner, for example);
c) Create a responder to simulate the credit check system;
d) Configure a generator to inject an order entry message onto the bus;
e) Configure a collector to gather message information;
f) Configure a validation process;
g) Execute the test;
h) Transmit validation results back to the test tool or test engineer; and
i) Run a post-test clean-up.

Test Message Generation

At the outset, it should be noted that an ability to send "Create New Order" messages from the system orchestrating the test (WinRunner) is essential to starting the transaction flow. To address this, the message generator 900, along with its WinRunner interface driver, may be used to easily create the initiating message.

Figure 13:
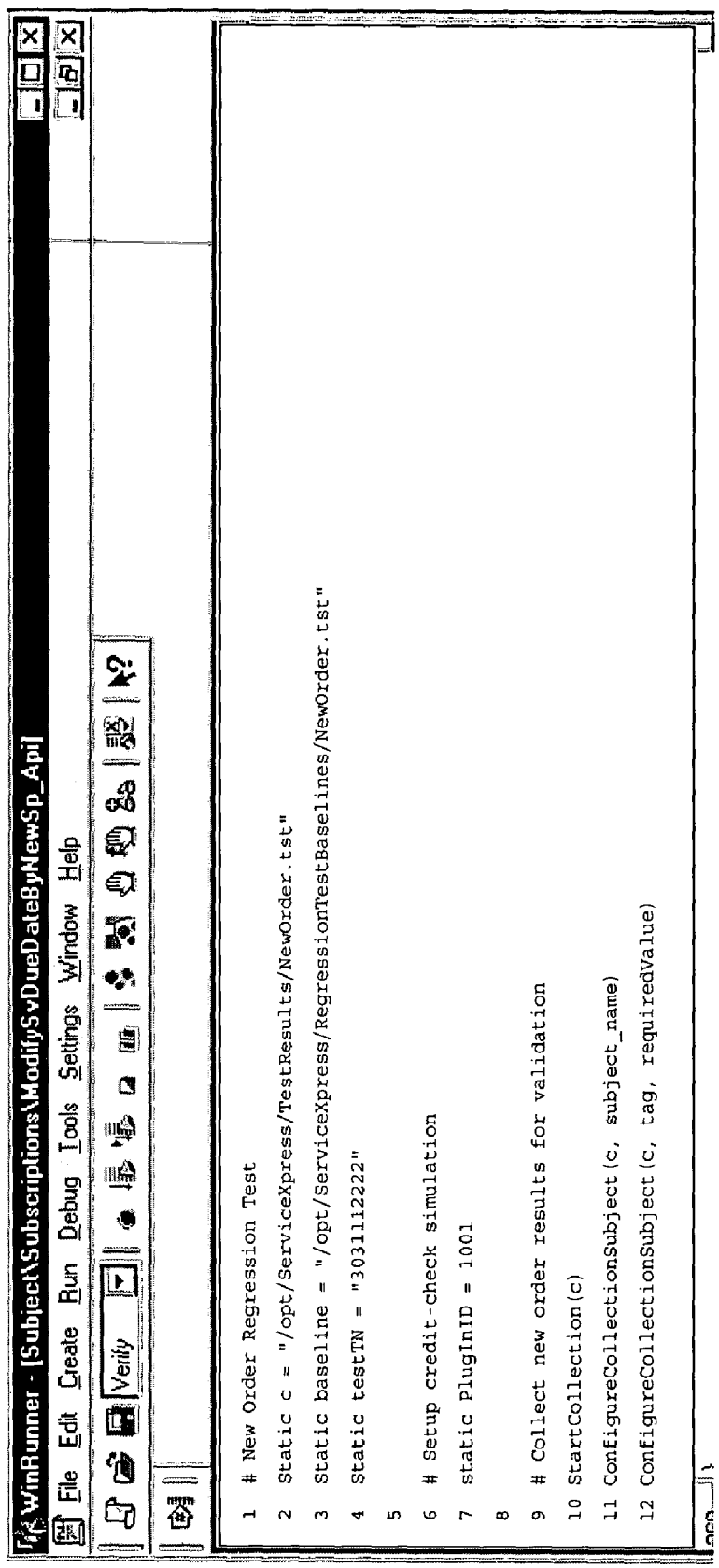
FIG. 13 is a screen shot of initial TSL code in a GUI test tool (WinRunner)

In FIG. 13, a test is created through the WinRunner GUI and coding is begun in a test scripting language ("TSL"). Although the code in FIG. 13 is only for illustrative purposes, it is assumed for this example that the test harness interface to the message generator 900 will be used to create a "Create New Order" message.

The test harness architecture for message generation is spread across the WinRunner platform, where a test harness Extension is provided to control the message generator 900, and a Unix platform where the bulk of the EAI system exists and where the actual message generator application (a test harness "plugin") runs.

To create the test message, an XML template file on a Unix device is referenced by the TSL code. This allows the test engineer to send large and possibly complex messages to the bus 102 using existing XML messages without having to "code" the entire message. Instead, the test engineer need only reference a template (which could have thousands of XML elements in it) and change just those element values which are important for the test: only minimal coding is necessary. In the present example, only the order number and telephone number ("TN") need to be specified. The following is a resulting TSL script:

Static testTN="3031112222"
Static testOrderNum="823"
Msg=CreateMsg ("/opt/ServiceXpress/TestTemplates/NewOrderTemplate.xml")
ConfigureMsg(msg, "TN", testTN)
ConfigureMsg(msg, "OrderNum", testOrderNum)

Figure 14:
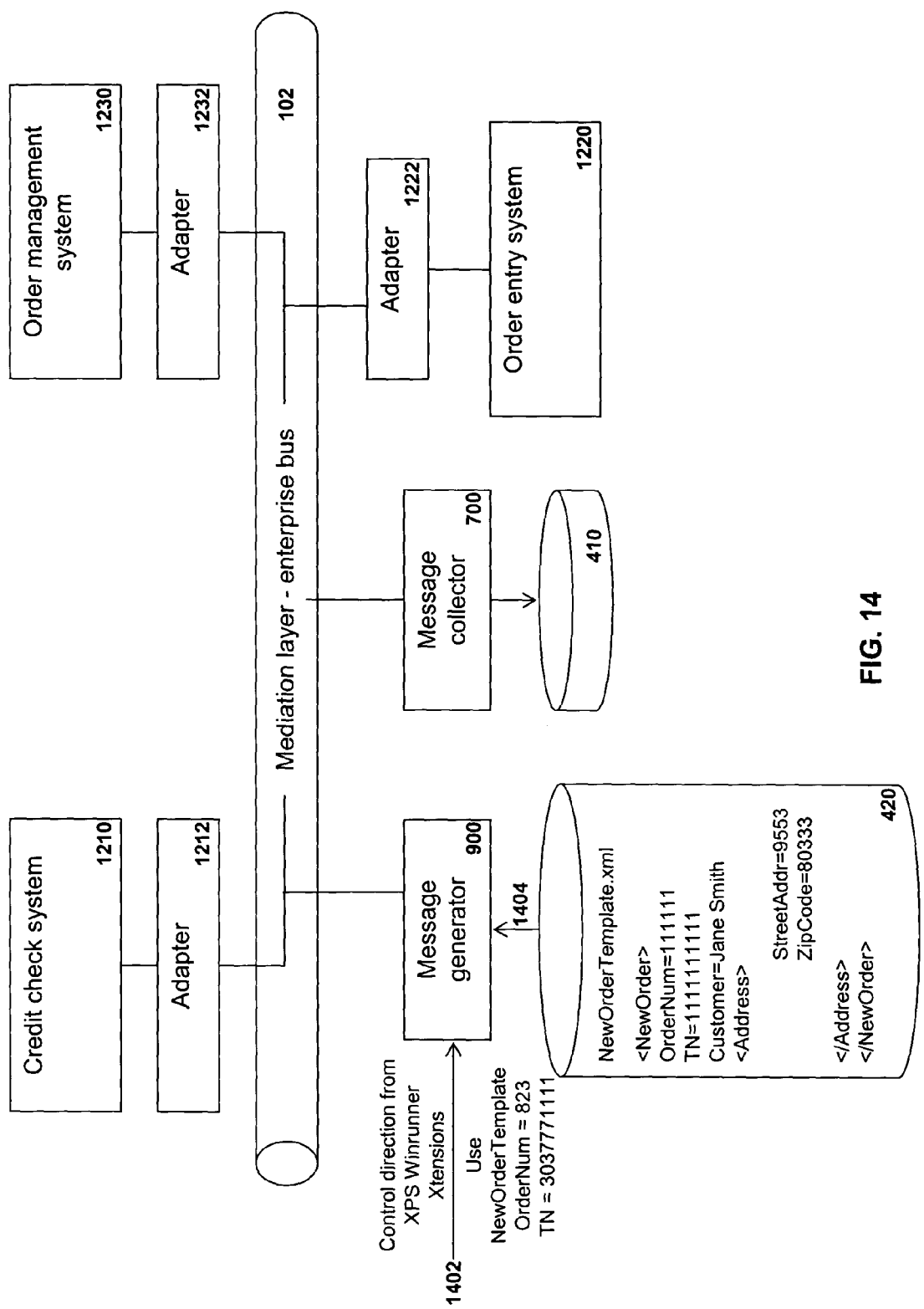
FIG. 14 is a system diagram illustrating configuration of the message generator.

The message configuration process is illustrated in FIG. 14 from the perspective of the test harness plugins which make up the EAI side of the architecture. When the script is executed, the test controller 600 transmits a configuration signal to the message generator 900 (step 1402) which, in response, retrieves the specified template from the template database 420 (step 1404).

Before sending this message, however, there are several other items which should be completed. The first is to program the collection of the expected resulting messages from the order management system ("OMS") 1230 and (for this example) generate the "New Validated Order" message from the credit check engine 1210 to which the OMS 1230 will directly respond. The test harness architecture uses the message collector 700 and an associated WinRunner interface to collect test data results. This is roughly analogous to a configurable butterfly net in which the TSL code can indicate those characteristics of the messages which are important for validating the success of the test. Such configurability also allows for a number of test engineers to keep their respective test results separate. Exemplary scripting to configure the message collector 700 is as follows:

Collect new order and credit check results for validation
Just collect data for our NPA
Static c="/opt/ServiceXpress/TestResults/NewOrder.tst"
StartCollection(c)
ConfigureCollectionSubject(c,SYS.NEWORDER.COMPLETION.RESULT)
ConfigureCollectionByData(c, "TN", XPS_LIKE, "303*")
ConfigureCollectionSubject(c, SYS.NEWORDER.CREDIT.VALIDATE)
ConfigureCollectionByData(c, "TN", XPS_LIKE, "303*")

Figure 15:
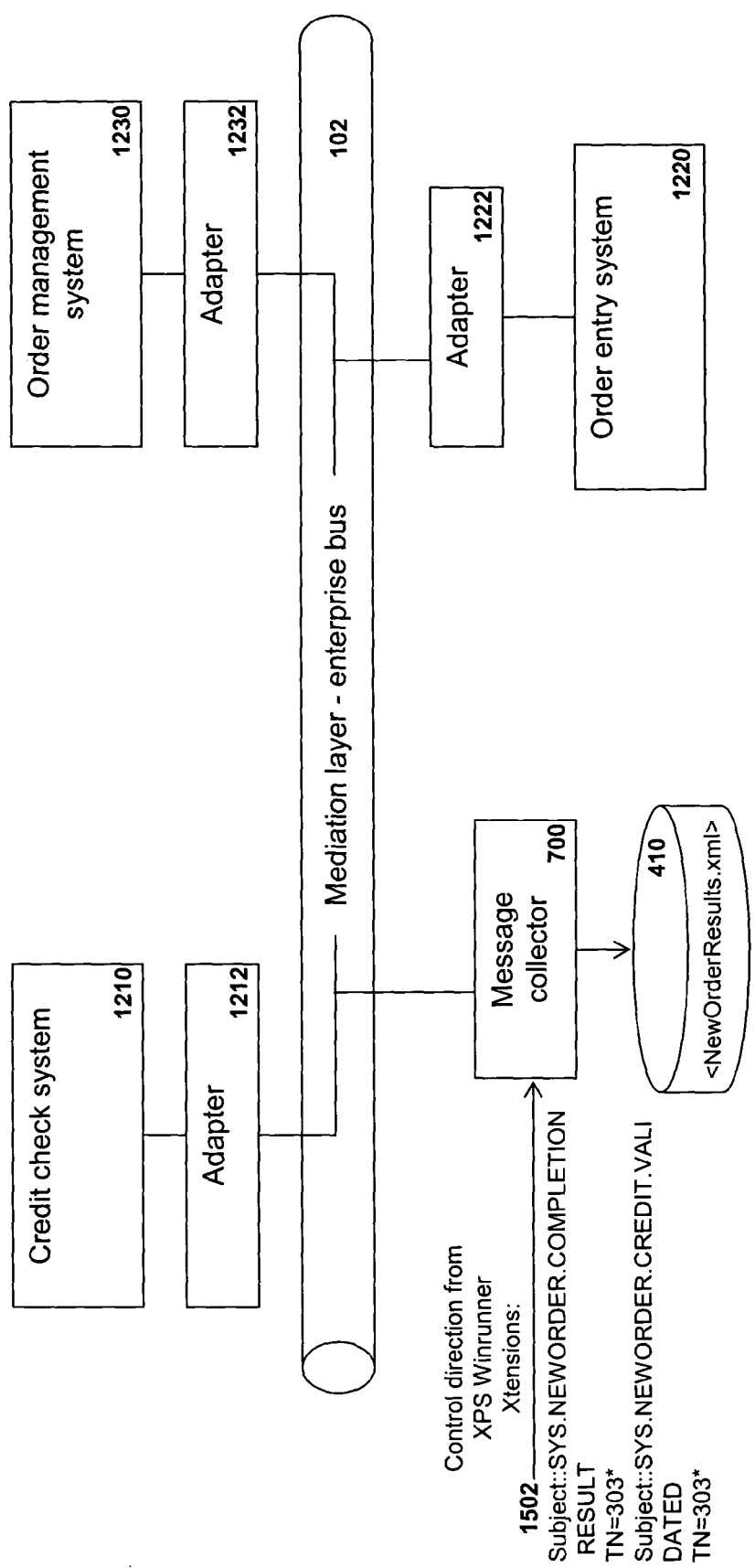
FIG. 15 is a system diagram illustrating configuration of the message collector.

Note that the messages collected do not have to be sent back to the test tool 300, but are managed by the message collector 700 on the Unix System for later validation in that environment. The resulting activities in the test harness architecture may be represented as illustrated in FIG. 15 in which the message collection configuration is transmitted by the test controller 600 to the message collector 700 (step 1502) along with a request to store collected messages in the repository 410 (step 1504).

Simulation of External System Responses

Because it is assumed that the credit check system 1210 is unavailable of the test, a simulation of the credit check engine 1210 will be configured. To test using the OMS 1230 with the same message flow (beginning with the order entry system 1220 which the actual EAI system will use, a test harness responder 1000 will be programmed to create a reasonable simulation of the credit check engine 1210. This may be done entirely under the control of the testing script as follows:

```
# Setup credit-check simulation on a particular plugin
    instance
static PluginID=1001
r=CreateResponse(PluginID,    "SYS.CREATE_NEW_
    ORDER",    "SYS.NEW_VALIDATED_ORDER",
    "ResponseTemplate.xml", 20)
AddResponseRuleMapping(r, "TN", "TN")
AddResponseRuleMapping(r, "OrderNum", "OrdNum-
    ber")
AddResponseRuleAssignment(r, "ServiceBureau", "Test-
    ing")
```

The small amount of TSL script configures a responder 1000 (which may be one of several and which may also be responding to other messages for other tests and test engineers as well) to simulate the credit check engine 1210. In particular, the above code demonstrates how the responder 1000 will:

a) Listen for a message with a subject of SYS.CREATE_NEW_ORDER;

b) Respond with a new message based on the specified template and having a new message subject of SYS.NEW_VALIDATED_ORDER;

c) Replace the TN value in the template with the TN value specified in the incoming "trigger" message;

d) Replace the OrderNum value in the template with the OrderNum value specified in the incoming message; and e) Wait 20 seconds before sending the response.

Figure 16:
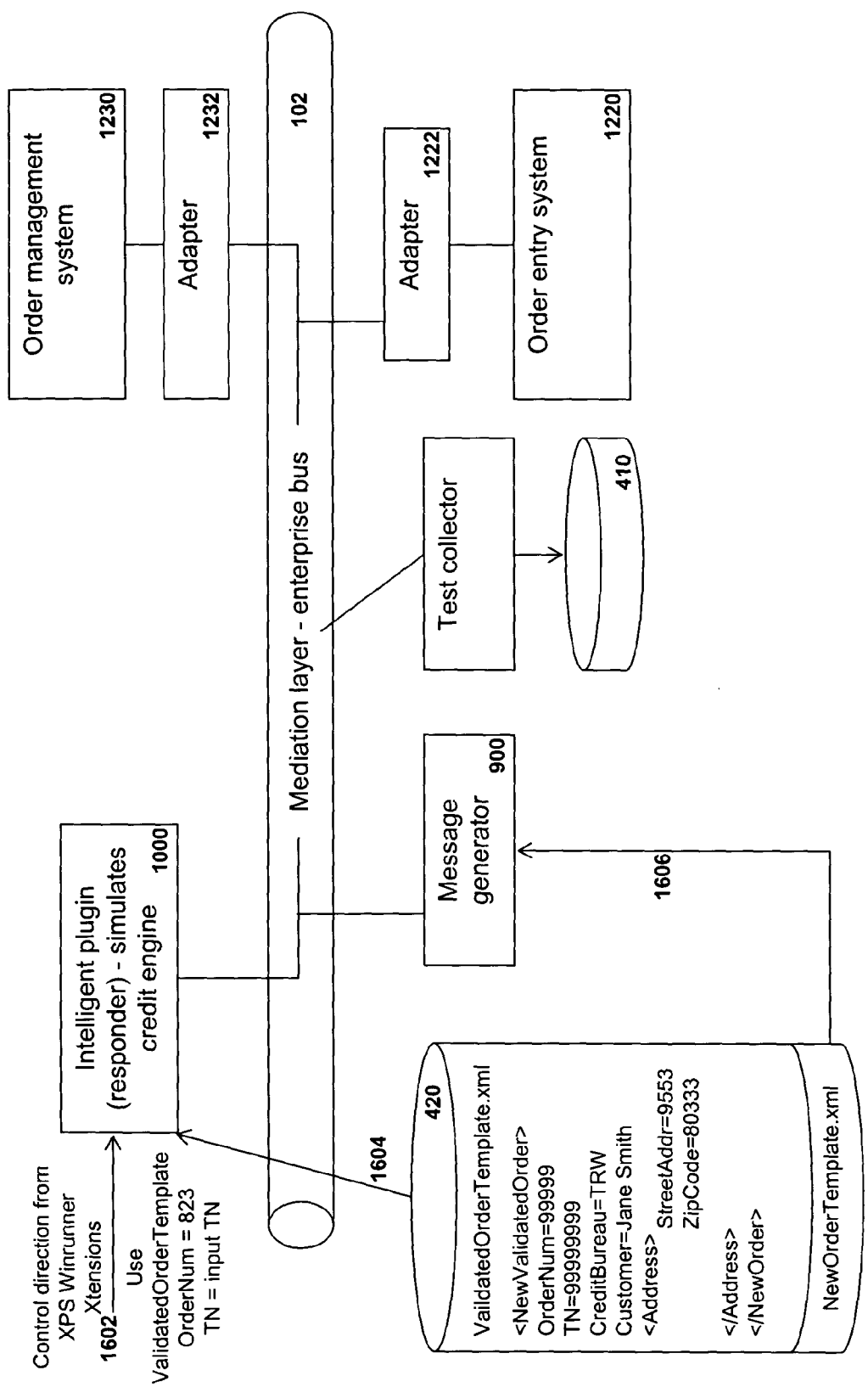
FIG. 16 is a system diagram illustrating configuration of the responder.

The results are illustrated in FIG. 16: the test controller 600 transmits a control signal (step 1602) to the responder 1000 which accesses the specified template from the template database 420 (step 1604); the responder 1000 (acting as a message generator 900) is also programmed to transmit a message based on another template in the database 420 (step 1606).

Running the Test

The test now is configured sufficiently to actually send the starting message and continue to the validation step. The following code accomplishes this as well as stopping the responder 1000 and collector 700:

```
Send Msg(msg)
StopCollection(c)
StopResponse(r)
#Clean up
```

Figure 17:
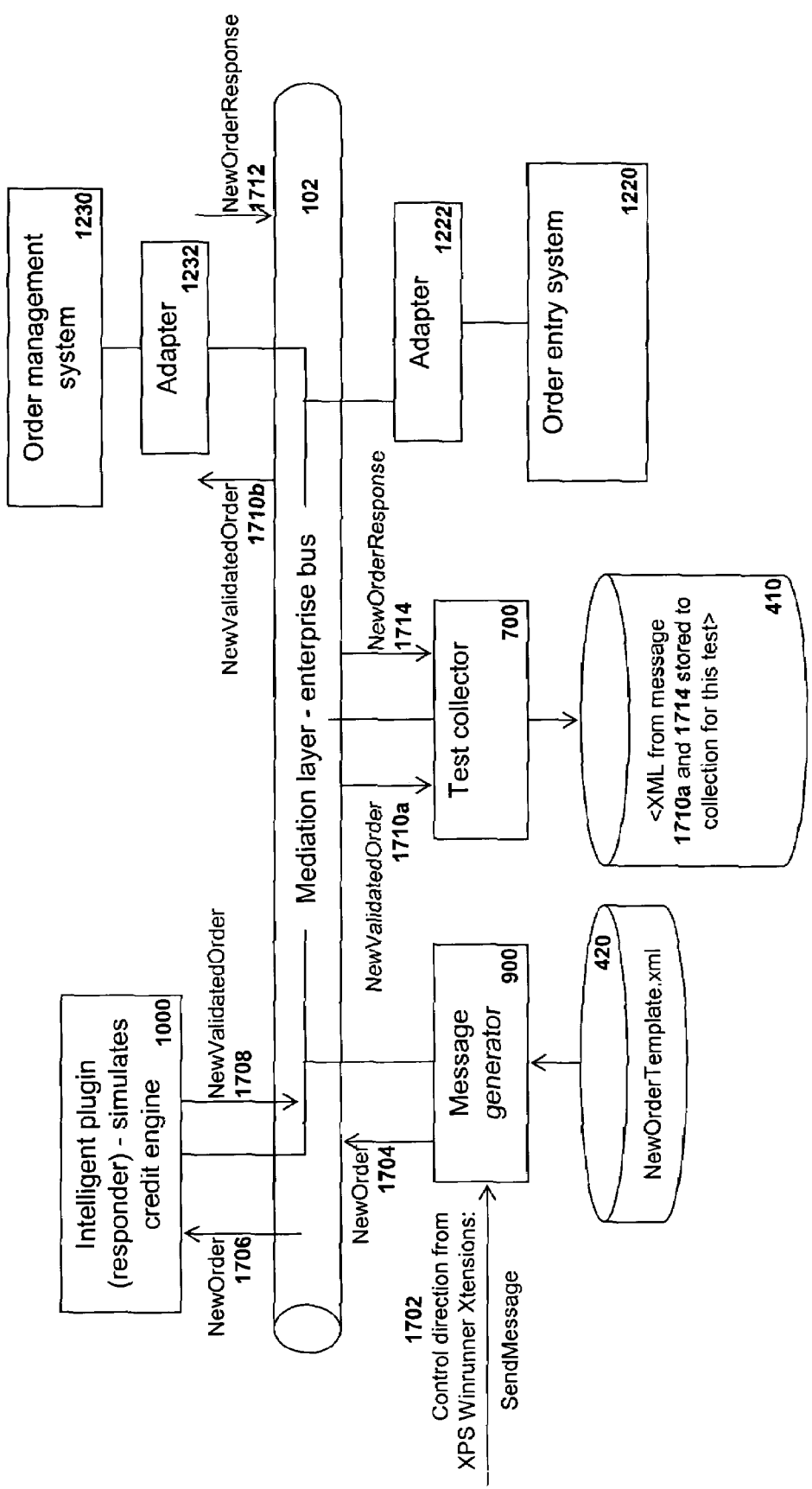
FIG. 17 is a system diagram illustrating the execution of the test.

The resulting sequence of activities in the EAI system is illustrated in FIG. 17. The test controller 600 transmits a start control signal to the message generator 900 (step 1702) which transmits the initiating 'NewOrder' message onto the bus 102 (step 1704). The responder 1000 receives the message (step 1706) and responds with its own 'NewValidatedOrder' message onto the bus 102 (step 1708). This message is received by both the collector 700 (step 1710*a*) an the order management system 1230 (step 1710*b*). The latter responds with a 'NewOrderResponse' message (step 1712) which is received by the collector 700 (step 1714). The collector 700 stores both messages in the repository 410.

After the test has been run, this TSL halts message collection and message responses. The 'clean up' command restores the EAI test bed (i.e., all of the EAI facilities and applications which participated in the test) back to their original, pre-test states. Clean up may require, for example, initiation of compensating or off-setting transactions or calls to external database scripts.

Validating the Test

With execution of the test having been completed, a final element of the test harness architecture will now be utilized. This last system element is the test validator 800, a test harness plugin which allows current test results to be intelligently compared to baseline regression test expected data; the results may then be returned to the test engineer through WinRunner. The validation process resembles the following from the TSL writer's view:

```
AddValidationRuleIgnore(c, "SucessDate")
AddValidationRuleMatch(c, "OrderNumber", testOrder-
    Number)
# Push final result to TestDirector for recording
Static   baseline=   "/opt/ServiceXpress/RegressionTest-
    Baselines/NewOrder.tst"
Return ValidateResults(c, baseline)
```

Figure 18:
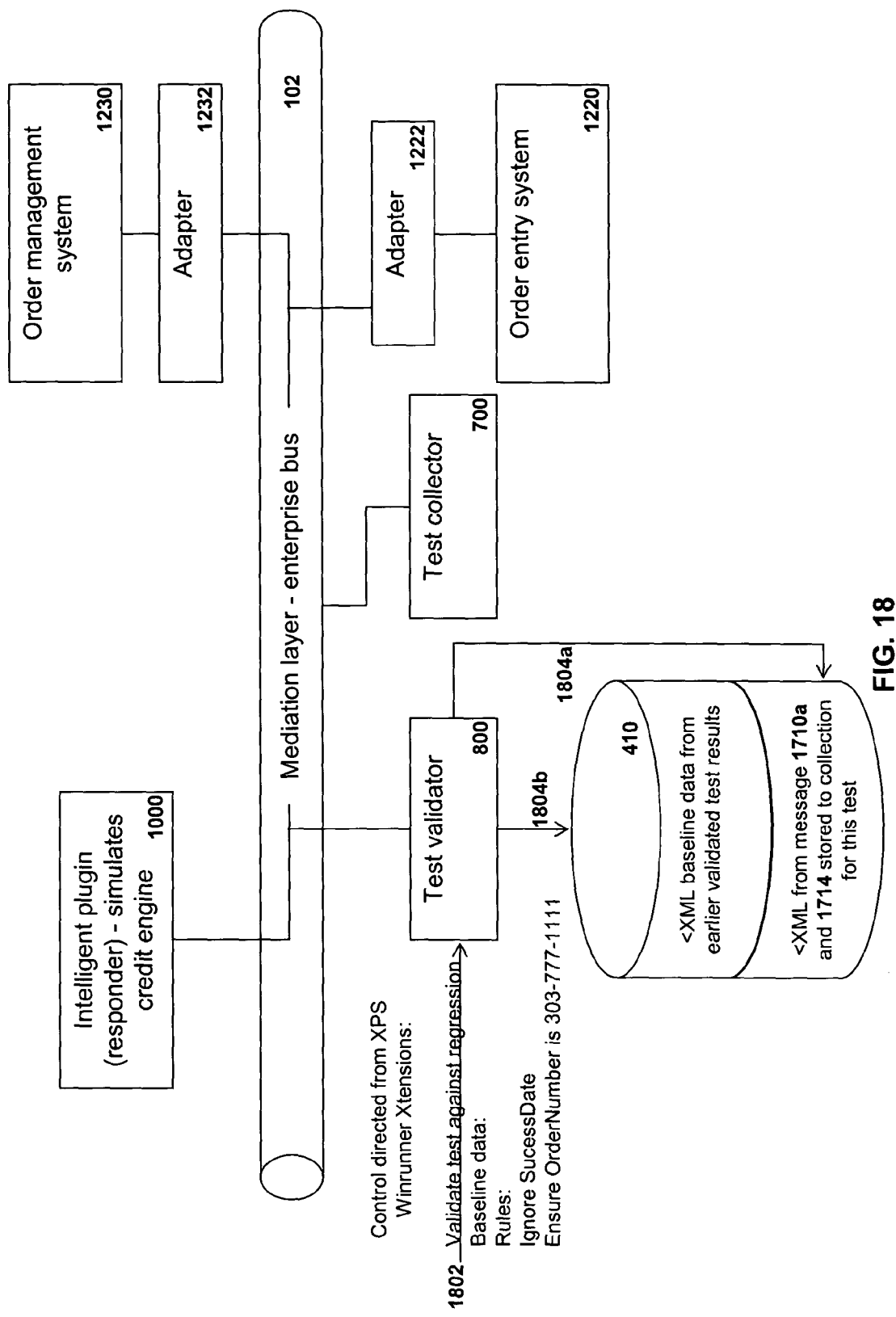
FIG. 18 is a system diagram illustrating the validation of the test.

The above code accounts for the expected and reasonable differences between the baseline and the results from this particular test by ignoring some data elements and specifying the expected values of others. In so doing, the test harness 100 even allows for establishing templates of expected (baseline) test results as well as response and test messages. FIG. 18 illustrates the validation process. After being configured 1802, the validation process compares the actual message (based on a 'NewValidatedOrder' template and a 'NewOrderResults' template) (step 1804*a*) and the corresponding baseline message templates (step 1804*b*) as shown in the following Table:

| Regression Test Baseline: "/opt/ServiceXpress/Regression-TestBaselines/NewOrder.tst" | Actual Test Results from collector: |
|---|---|
| <NewValidatedOrder><br>    OrderNum="354"<br>    TN=303-777-1111<br>    CreditBureau=Test<br>    Customer=Jane Smith<br><Address><br>    StreetAddr=9553<br>    ZipCode=80333<br></Address><br></NewValidatedOrder><br><NewOrderResults><br>    OrderNum="354"<br>    SuccessDate="2/12/2003"<br>    Status="Success"<br></NewOrderResults> | <NewValidatedOrder><br>    OrderNum="823"<br>    TN=303-777-1111<br>    CreditBureau=TRW<br>    Customer=Jane Smith<br><Address><br>    StreetAddr=9553<br>    ZipCode=80333<br></Address><br></NewValidatedOrder><br><NewOrderResults><br>    OrderNum="823"<br>    SuccessDate="3/16/2003"<br>    Status="Success"<br></NewOrderResults> |

Based on the comparison, the test has been successfully validated. The test is concluded and the WinRunner code returns the results to the test engineer.

The objects of the invention have been fully realized through the embodiments disclosed herein. Those skilled in the art will appreciate that the various aspects of the invention may be achieved through different embodiments without departing from the essential function of the invention.

The particular embodiments are illustrative and not meant to limit the scope of the invention as set forth in the following claims.

What is claimed is:

1. A system for testing message flow in an enterprise application integration (EAI) message bus environment comprising:
   a test controller;
   a message collector, comprising:
      a first configuration interface coupled to receive first message selection criteria from the test controller;
      a first receiver coupled to receive messages transmitted among enterprise applications on the message bus; and
      first means for comparing data elements in the messages received through the first receiver against the first message selection criteria whereby received messages which meet the message selection criteria are identified; and
   a message validator, comprising:
      a second configuration interface coupled to receive message validation criteria from the test controller;
      means for comparing the messages identified by the message collector against the message validation criteria; and
      a first transmitter for transmitting results of the comparison to the test controller; and
   a message responder to simulate a predetermined enterprise application, comprising:
      a fourth configuration interface coupled to receive second message selection criteria and response rules from the test controller;
      a second receiver coupled to receive messages transmitted among enterprise applications on the message bus;
      second means for comparing data elements in the messages received though the second receiver against the second message selection criteria; and
      a second message transmitter, responsive to the second means for comparing data elements, coupled to transmit the test messages onto the message bus in response to messages which meet the second message selection criteria;
      wherein the message responder appears to enterprise applications on the message bus as the predetermined enterprise application.

2. The system of claim 1, wherein the simulated predetermined enterprise application is unavailable to participate in testing the message flow.

3. The system of claim 1, wherein the simulated predetermined enterprise application would introduce undesirable effects as an active participant of the testing of the message flow.

4. The system of claim 1, further comprising a message template database containing a plurality of message templates selectable by the message responder whereby the second means for comparing compares a selected message template against messages received from the message bus.

5. The system of claim 1, further comprising a message template database containing a plurality of message templates selectable by the message responder to generate messages for transmission onto the message bus.

6. A system for testing message flow in an enterprise application integration (EAI) message bus environment, comprising:
   a test controller;
   a message collector, comprising:
      a first configuration interface coupled to receive first message selection criteria from the test controller;
      a first receiver coupled to receive messages transmitted among enterprise applications on the message bus; and
      first means for comparing data elements in the messages received through the first receiver against the first message selection criteria whereby received messages which meet the message selection criteria are identified; and
   a message validator, comprising:
      a second configuration interface coupled to receive message validation criteria from the test controller;
      means for comparing the messages identified by the message collector against the message validation criteria; and
      a first transmitter for transmitting results of the comparison to the test controller; and
   a message tee coupled to the message bus and transparently interposed between first and second off-bus, point-to-point applications, the message tee responsive to control signals from the test controller and having at least one operating mode selected from a listen mode, an intercept mode and a pass-through mode.

7. The system of claim 6, the message tee comprising:
   a first translator, operable in the intercept and listen modes, for translating messages in a point-to-point format between the first and second applications into XML format; and
   a third message transmitter coupled to transmit the translated messages onto the message bus.

8. The system of claim 7, the message tee further comprising:
   a third receiver, operable in the intercept mode, coupled to receive XML formatted messages transmitted to one of the first and second applications from the message bus; and
   a second translator for translating the received messages from XML format into the point-to-point format.

9. A control interface for testing message flow in an enterprise application integration (EAI) message bus environment, comprising:
   a first transmitter for transmitting first message selection criteria to a message collector coupled to the message bus whereby the message collector receives messages transmitted among enterprise applications on the message bus and identifies messages which meet the first message selection criteria;
   a second transmitter for transmitting message validation criteria to a message validator whereby the message validator compares the messages identified by the message collector against the message validation criteria;
   a receiver for receiving results of the comparison by the message validator; and
   a fourth transmitter for transmitting control signals to a message tee coupled to the message bus and transparently interposed between first and second off-bus, point-to-point applications, the control signals directing the message tee to operate in at least one operating mode selected from a listen mode, an intercept mode and a pass-through mode.

10. A method for testing message flow in an enterprise application integration (EAI) message bus environment, comprising:
    generating first message selection criteria;
    generating message validation criteria;

receiving messages transmitted among enterprise applications on a message bus;
identifying received messages which meet the first message selection criteria;
comparing identified messages against the message validation criteria;
transmitting results of the comparison to a user; and
simulating a predetermined enterprise application comprising:
- receiving second message selection criteria;
- receiving messages transmitted among enterprise applications on the message bus;
- identifying received messages which meet the second message selection criteria; and
- transmitting test messages onto the message bus in response to messages which meet the second message selection criteria.

11. A method for testing message flow in an enterprise application integration (EAI) message bus environment, comprising:
generating first message selection criteria;
generating message validation criteria;
receiving messages transmitted among enterprise applications on a message bus;
identifying received messages which meet the first message selection criteria;
comparing identified messages against the message validation criteria;
transmitting results of the comparison to a user; and
transparently listening to messages in a point-to-point format between first and second off-bus applications.

12. The method of claim 11, further comprising:
translating the point-to-point formatted messages into XML formatted messages; and
transmitting the XML formatted messages onto the message bus.

13. The method of claim 12, further comprising:
receiving XML formatted messages from the message bus directed towards one of the first and second off-bus applications;
translating the XML formatted messages into point-to-point formatted messages; and
transmitting the point-to-point messages to the one of the first and second off-bus applications.

14. A computer program product of a computer readable medium usable with a programmable computer, the computer program product having computer-readable code embodied therein for testing message flow in an enterprise application integration (EAI) message bus environment, the computer-readable code comprising instructions for:
generating first message selection criteria;
generating message validation criteria;
receiving messages transmitted among enterprise applications on a message bus;
identifying received messages which meet the first message selection criteria;
comparing identified messages against the message validation criteria;
transmitting results of the comparison to a user;
simulating the predetermined enterprise application comprising:
- receiving second message selection criteria;
- receiving messages transmitted among enterprise applications on the message bus;
- identifying received messages which meet the second message selection criteria; and
- transmitting test messages onto the message bus in response to messages which meet the second message selection criteria.

15. The computer program product of claim 14, further comprising instructions for:
translating the point-to-point formatted messages into XML formatted messages; and
transmitting the XML formatted messages onto the message bus.

16. The computer program product of claim 15, further comprising instructions for:
receiving XML formatted messages from the message bus directed towards one of the first and second off-bus applications;
translating the XML formatted messages into point-to-point formatted messages; and
transmitting the point-to-point messages to the one of the first and second off-bus applications.

17. A computer program product of a computer readable medium usable with a programmable computer, the computer program product having computer-readable code embodied therein for testing message flow in an enterprise application integration (EAI) message bus environment, the computer-readable code comprising instructions for:
generating first message selection criteria;
generating message validation criteria;
receiving messages transmitted among enterprise applications on a message bus;
identifying received messages which meet the first message selection criteria;
comparing identified messages against the message validation criteria;
transmitting results of the comparison to a user; and
transparently listening to messages in a point-to-point format between first and second off-bus applications.

* * * * *